United States Patent [19]
Creps et al.

[11] Patent Number: 6,125,883
[45] Date of Patent: Oct. 3, 2000

[54] FLOOR MOUNTED DOUBLE CONTAINMENT LOW PROFILE SUMP PUMP ASSEMBLY

[75] Inventors: John L. Creps, Rudolph; Richard A. Hallett, Delta, both of Ohio

[73] Assignee: Henry Filters, Inc., Bowling Green, Ohio

[21] Appl. No.: 09/004,889

[22] Filed: Jan. 9, 1998

[51] Int. Cl.[7] .................................................. E03B 11/00
[52] U.S. Cl. ................ 137/565.3; 137/362; 137/565.22; 137/565.37; 137/574
[58] Field of Search ..................... 137/565.01, 565.37, 137/565.22, 565.3, 574, 362, 238, 240

[56] References Cited

U.S. PATENT DOCUMENTS

| | | | |
|---|---|---|---|
| 2,247,116 | 6/1941 | Day | 137/565.22 |
| 2,431,640 | 11/1947 | Gordon | 137/362 |
| 2,953,156 | 9/1960 | Bryant | 137/565.3 |
| 3,049,171 | 8/1962 | Neuerburg et al. | 137/574 |
| 3,252,478 | 5/1966 | Limberger | 137/565.37 |
| 4,838,307 | 6/1989 | Sasaki et al. | 137/574 |
| 5,111,844 | 5/1992 | Emmert et al. | 137/574 |
| 5,380,446 | 1/1995 | Bratten . | |
| 5,466,380 | 11/1995 | Bratten . | |
| 5,593,596 | 1/1997 | Bratten . | |

*Primary Examiner*—A. Michael Chambers
*Attorney, Agent, or Firm*—Howard & Howard

[57] ABSTRACT

A floor mounted sump pump assembly for pumping particulate laden dirty coolant discharged by a floor mounted machine tool station includes a sump tank having a cylindrical wall spaced around a central axis and an inclined bottom with a central lower region. A pump is positioned within the sump tank offset from the central axis. The pump has an inlet oriented above and adjacent to the central lower region. A conduit has an outlet coupled to the sump tank for discharging dirty coolant from the machine tool station into the sump tank. The discharged dirty coolant swirls down around the inclined bottom to the central lower region for the pump inlet to pump the dirty coolant out of the sump tank. An overflow tank is adjacent to the sump tank to collect overflow coolant from the sump tank. A return pump is operable with the overflow tank to discharge the overflow coolant back into the sump tank. The sump tank is sized sufficiently small to maintain a sufficient coolant swirl velocity to prevent particulate from settling out.

9 Claims, 6 Drawing Sheets

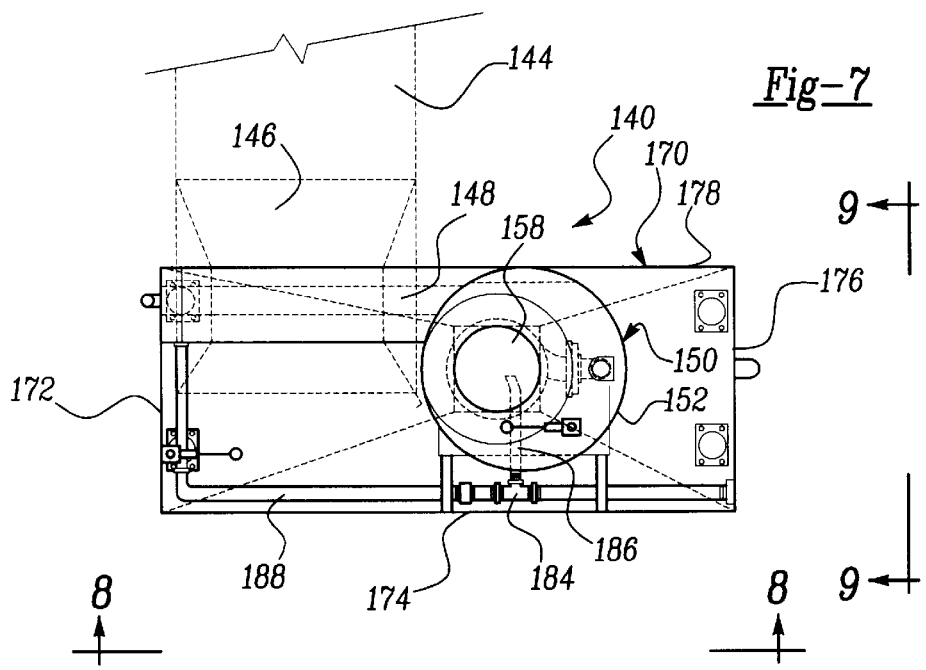
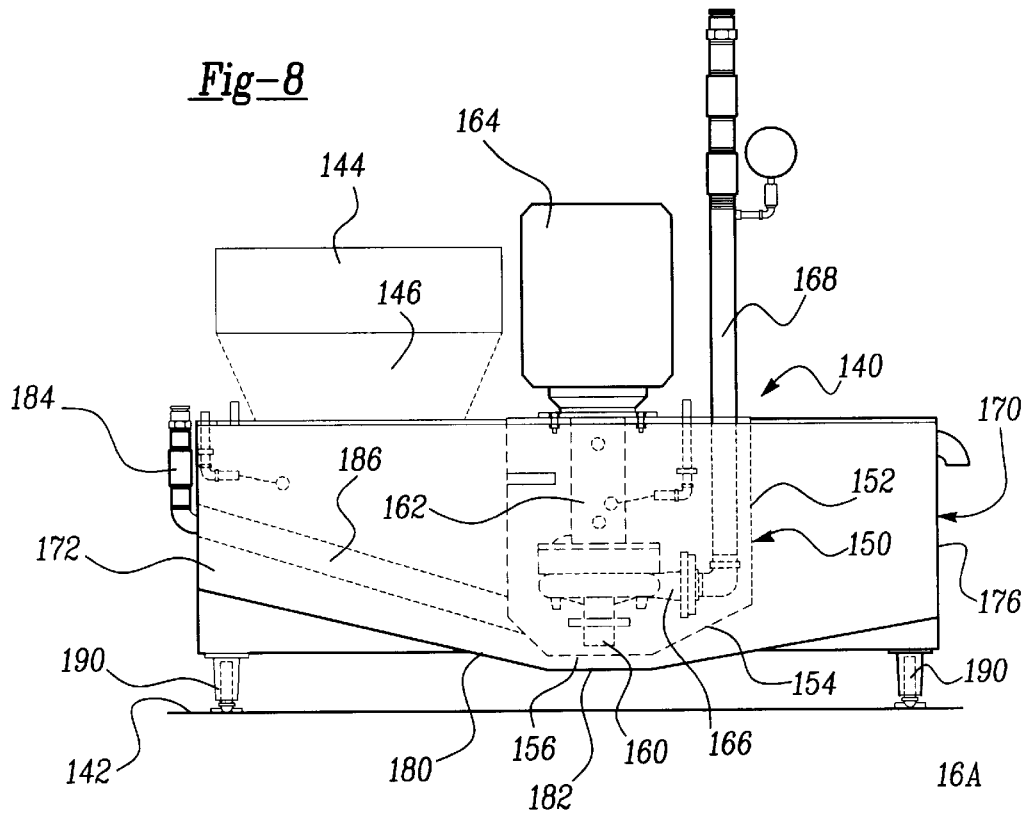

FLOOR MOUNTED DOUBLE CONTAINMENT LOW PROFILE SUMP PUMP ASSEMBLY

TECHNICAL FIELD

The present invention relates generally to sump pump assemblies for machine coolant and, more particularly, to a floor mounted sump pump assembly for pumping particulate laden dirty coolant discharged by a floor mounted machine tool station.

BACKGROUND ART

In machining operations, coolant is circulated to a machine tool station, e.g., machining or washing equipment, to cool the parts being processed and to flush machine waste such as particulate and metal chips from the machine tool station. The dirty coolant flows down along a sloped trough to a sump. The trough is typically positioned underneath the machine tool station. A sump pump then pumps the dirty coolant collected by the sump to a filtration station. The filtration station filters the dirty coolant to remove the particulate therefrom. Filtered coolant is then returned from the filtration station to the machine tool station to start the flow cycle again.

Typically, the machine tool station is mounted above a floor, i.e., floor mounted, to enable operator access. Because a typical sump pump assembly has a large profile, the floor needs to be excavated to place the assembly at a level beneath the machine tool station. If the typical sump pump assembly were mounted above the floor then the machine tool station would have to be raised above the floor at a level which would make operator access impractical. Further, excavation of a floor is expensive and may be impossible depending on what is beneath the floor. Still further, excavation leaves large holes in the floor making subsequent rearrangement of machine tool stations limited and difficult.

SUMMARY OF THE INVENTION

Accordingly, it is an object of the present invention to provide a floor mounted sump pump assembly for pumping particulate laden dirty coolant discharged by a floor mounted machine tool station.

It is another object of the present invention to provide a floor mounted sump pump assembly having a sump tank sized sufficiently small to maintain a sufficient velocity of the dirty coolant swirling in the sump tank to prevent particulate from settling out into the sump tank prior to being pumped by a sump pump within the sump tank.

It is a further object of the present invention to provide a floor mounted sump pump assembly having an overflow tank adjacent to a sufficiently small sized sump tank so that in the event that the sump tank overflows with dirty coolant the overflow tank collects such overflow coolant.

In carrying out the above objects and other objects, the present invention provides a floor mounted sump pump assembly for pumping particulate laden dirty coolant discharged by a floor mounted machine tool station. The sump pump assembly includes a sump tank having a generally cylindrical wall spaced around a central axis and an inclined bottom portion with a central lower region. A sump pump is positioned within the sump tank offset from the central axis of the sump tank. The sump pump has a pump inlet oriented above and adjacent to the central lower region of the sump tank.

The sump pump assembly further includes a conduit having an inlet and an outlet. The inlet is coupled to a floor mounted machine tool station for receiving particulate laden dirty coolant from the machine tool station. The outlet is coupled to the sump tank for discharging the dirty coolant into the sump tank. The outlet is oriented generally tangential to the cylindrical wall of the sump tank such that the dirty coolant discharged into the sump tank swirls down around the inclined bottom portion to the central lower region for the pump inlet to draw the dirty coolant. The pump then pumps the drawn dirty coolant out of the sump tank.

An overflow tank is adjacent to the sump tank so that in the event that the sump tank overflows with dirty coolant the overflow tank collects such overflow coolant. A return pump is operable with the overflow tank to discharge the overflow coolant back into the sump tank. The sump pump assembly is further provided with support portions for orienting the sump pump assembly on the floor adjacent to the machine tool station.

The advantages accruing to the present invention are numerous. Because the sump pump assembly is placed on the floor adjacent to the floor mounted machine tool station, expensive excavation of the floor for the sump tank and the overflow tank is avoided. Further, the sump pump assembly can be placed on floors in which excavation would not be possible thereby enabling space of a manufacturing plant to be efficiently utilized. Still further, the sump pump assembly has a sufficiently low profile such that the machine tool station connected to the sump pump assembly can be positioned a practical distance off of the floor.

These and other features, aspects, and embodiments of the present invention will become better understood with regard to the following description, appended claims, and accompanying drawings.

BRIEF DESCRIPTION OF THE DRAWINGS

FIG. 7 is a top plan view of a sump pump assembly adjacent to a machine tool station in accordance with a third embodiment of the present invention;

FIG. 8 is a front view of the sump pump assembly of FIG. 7 along the line 8—8;

BEST MODES FOR CARRYING OUT THE INVENTION

Figure 1:
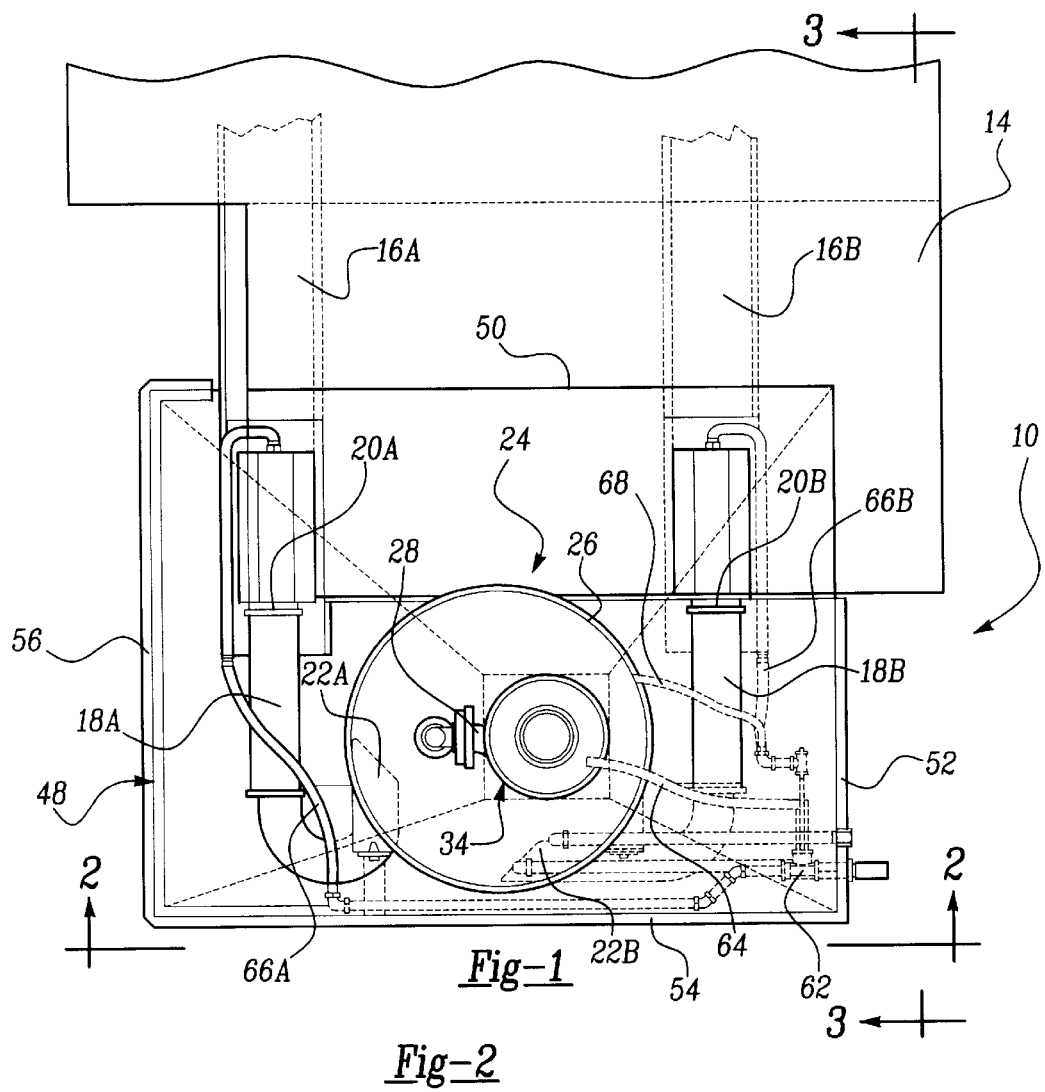
FIG. 1 is a top plan view of a sump pump assembly adjacent to a machine tool station in accordance with a first embodiment of the present invention.
Figure 2:
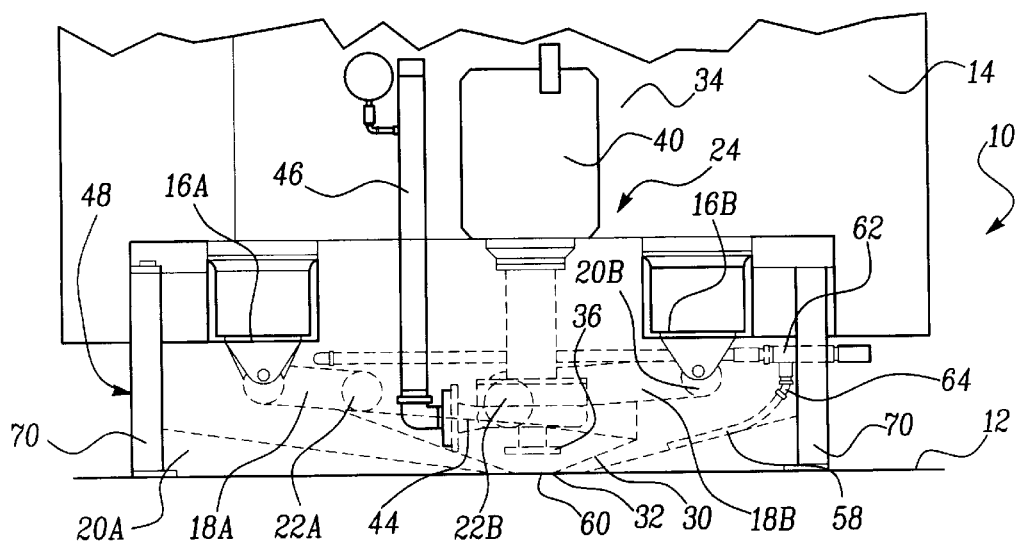
FIG. 2 is a front view of the sump pump assembly of FIG. 1 along the line 2—2.
Figure 3:
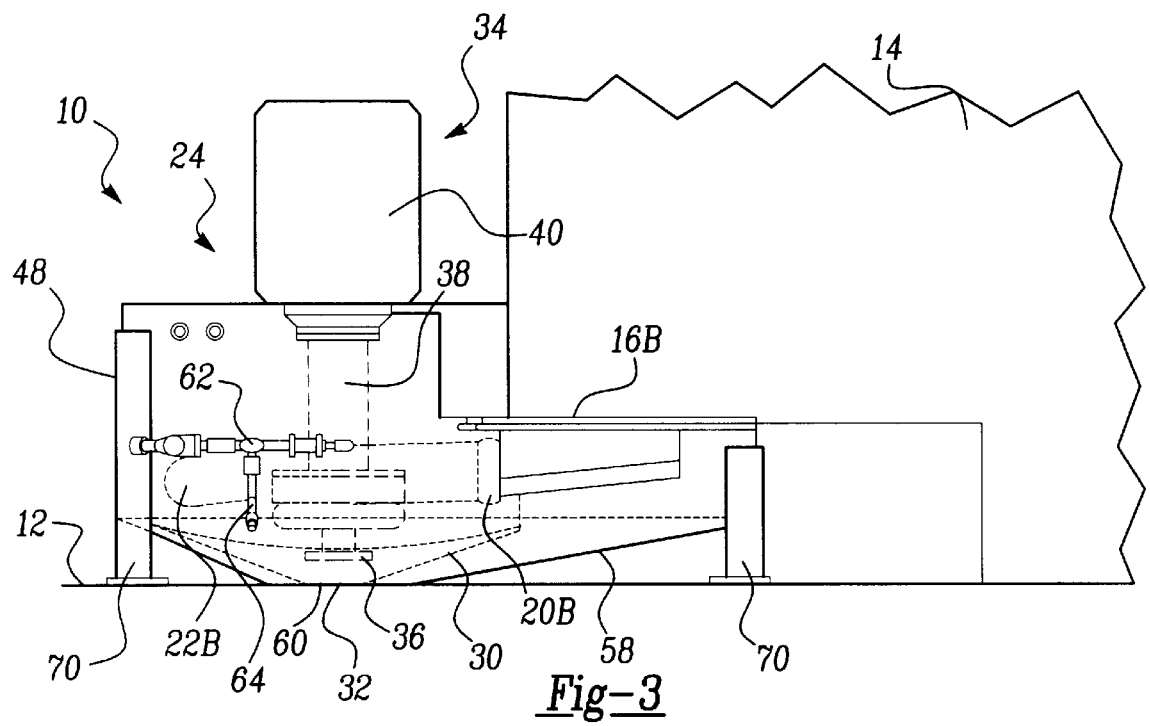
FIG. 3 is a side view of the sump pump assembly of FIG. 1 along the line 3—3.

Referring now to FIGS. 1, 2, and 3, a sump pump assembly 10 in accordance with a first embodiment of the present invention is shown. Sump pump assembly 10 is mounted above a floor 12 adjacent to a machine tool station 14. Machine tool station 14 receives and uses clean coolant for machining and washing operations of parts being processed in the machine tool station (not specifically shown). A pair of spaced apart parallel troughs 16(*a-b*) are positioned underneath machine tool station 14 above floor 12 to receive dirty coolant from the machine tool station. Troughs 16(*a-b*) may be sloped and/or include flow nozzles which direct jets of coolant into the troughs to cause the dirty coolant to flow down the troughs. The dirty coolant contains particulate and chips caused by the machining and washing operations of machine tool station 14.

Sump pump assembly 10 includes a pair of conduits 18(*a-b*) each having a respective inlet 20(*a-b*) coupled to respective troughs 16(*a-b*) for receiving particulate laden dirty coolant from machine tool station 14. Conduits 18(*a-b*) each have an outlet 22(*a-b*) coupled to a sump tank 24 for discharging the dirty coolant into the sump tank.

Sump tank 24 includes a generally cylindrical or circular wall 26 spaced around a central axis 28. Sump tank 24 further includes an inclined bottom portion 30 with a central lower region 32. Inclined bottom portion 30 has the form of a helix. Central lower region 32 is preferably either flat (as shown) or rounded.

A sump pump 34 is positioned within sump tank 24 offset from central axis 28. Sump pump 34 has a pump inlet 36 oriented above and adjacent to central lower region 32 of sump tank 24. Pump inlet 36 is spaced sufficiently close to central lower region 32 to be able to draw the particulate from dirty coolant and prevent it from settling in sump tank 24 on the central lower region.

Sump pump 34 includes an impeller shaft 38 driven by a motor 40 for drawing dirty coolant in sump tank 24 into pump inlet 36. A discharge port 44 connects a discharge pipe 46 to pump inlet 36. Dirty coolant drawn by pump inlet 36 flows through discharge pipe 46 to a filtration system (not specifically shown).

Outlets 22(*a-b*) of conduits 16(*a-b*) are oriented generally tangentially to cylindrical wall 26 of sump tank 24 such that the dirty coolant discharged into the sump tank has a given tangential velocity to swirl around the cylindrical wall and down around inclined bottom portion 30. Inclined bottom portion 30 is helical so that the dirty coolant swirls down into central lower region 32. Sump pump 34 is offset from central axis 28 to let the coolant swirl in sump tank 24. Inclined bottom portion 30 is inclined so that the particulate and chips in the dirty coolant do not get stuck in the corners of sump tank 24. Pump inlet 36 then draws the dirty coolant so that the dirty coolant may be pumped out of sump tank 24.

Sump tank 24 is sized sufficiently small relative to the size and density of the particulate to maintain a sufficient coolant swirl velocity to prevent the particulate from settling out in the sump tank. Because of the small size of sump tank 24 and inconsistent flow rates of dirty coolant into the sump tank during typical machining operations, dirty coolant may periodically overflow the sump tank.

Thus, sump pump assembly 10 further includes an overflow tank 48. Sump tank 24 is positioned within overflow tank 48. Overflow tank 48 includes side walls 50, 52, 54, and 56, and a bottom portion 58 with a central lower region 60. Central lower region 32 of sump tank 24 rests on central lower region 60 of overflow tank 48. Overflow tank 48 collects coolant in the event that the coolant overflows sump tank 24. This occurs when the level of coolant in sump tank 24 is higher than cylindrical wall 26 causing the coolant to fall over the cylindrical wall into overflow tank 48.

To return the overflow coolant into sump tank 24, overflow tank 48 includes a return pump 62 such as a venturi pump. Return pump 62 uses suction to suck coolant from the overflow tank and includes a suction pipe 64 for drawing coolant from overflow tank 48 and a pair of conduits 66(*a-b*) for discharging the drawn coolant back into respective conduits 18(*a-b*). Return pump 62 further includes a conduit 68 coupled to cylindrical wall 26 for discharging the drawn coolant directly back into sump tank 24.

Sump pump assembly 10 is further provided with support portions 70 such as legs for orienting the sump pump assembly on floor 12 adjacent machine tool station 14. Thus, sump pump assembly 10 is floor mounted just like machine tool station 14.

Figure 4:
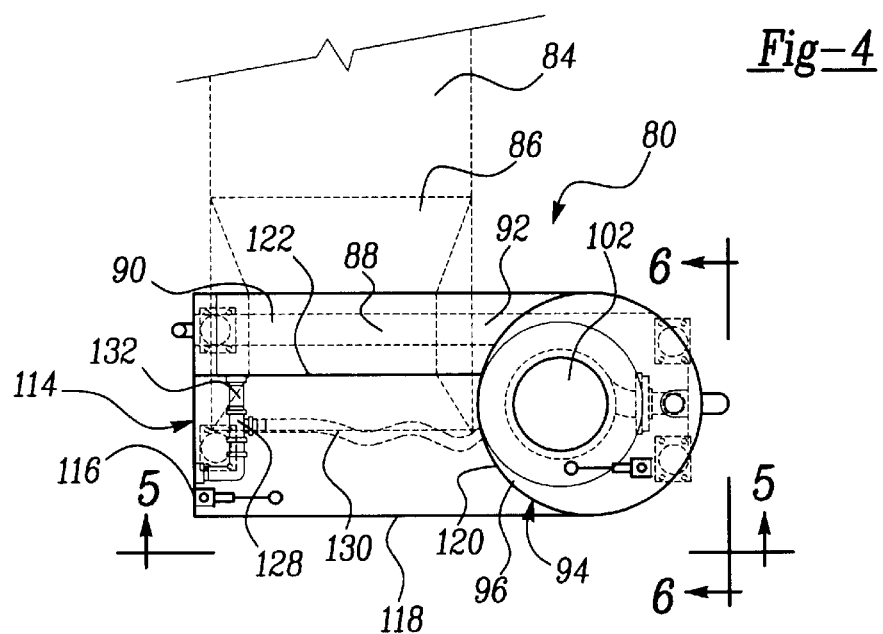
FIG. 4 is a top plan view of a sump pump assembly adjacent to a machine tool station in accordance with a second embodiment of the present invention.
Figure 5:
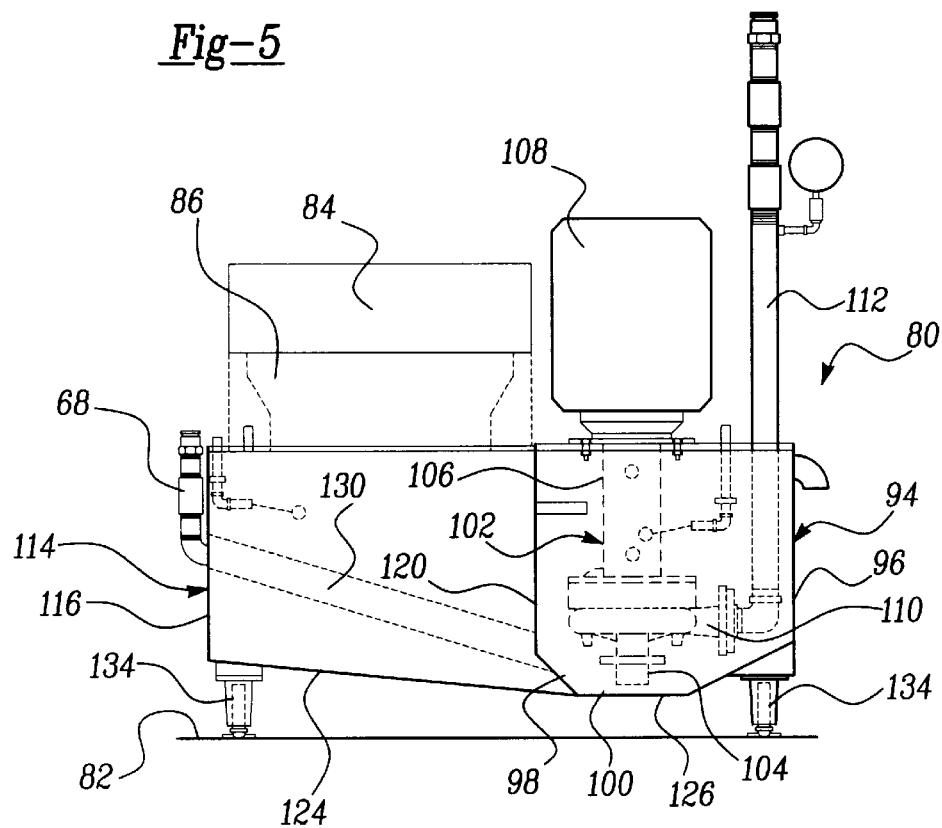
FIG. 5 is a front view of the sump pump assembly of FIG. 4 along the line 5—5.
Figure 6:
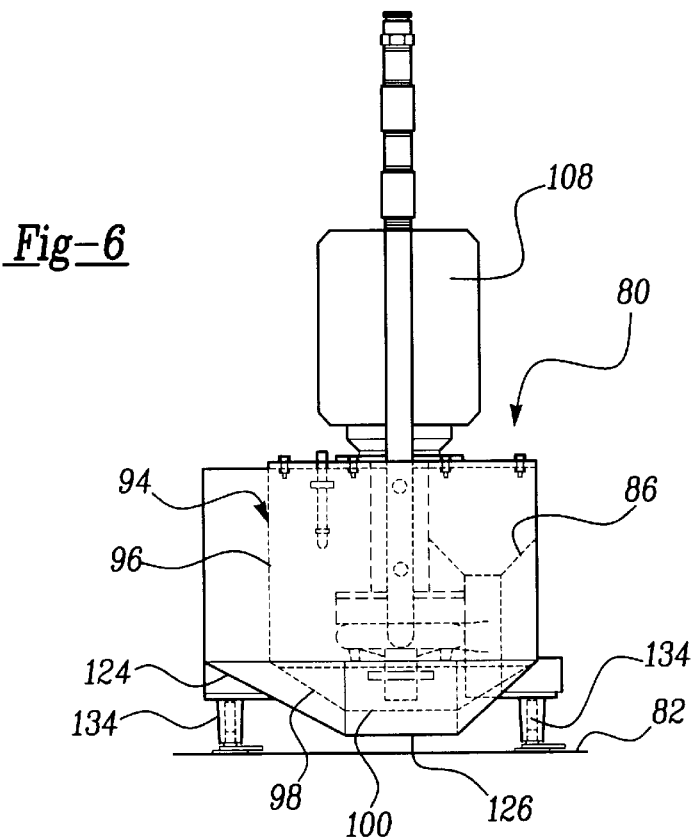
FIG. 6 is a side view of the sump pump assembly of FIG. 4 along the line 6—6.

Referring now to FIGS. 4, 5, and 6, a sump pump assembly 80 in accordance with a second embodiment of the present invention is shown. Sump pump assembly 80 is mounted above a floor 82 adjacent to a machine tool station 84. A trough 86 is positioned beneath machine tool station 84 above floor 82 to receive dirty coolant from the machine tool station.

Sump pump assembly 80 includes a conduit 88 having an inlet 90 coupled to trough 86 for receiving particular laden dirty coolant from machine tool station 84. Conduit 88 has an outlet 92 coupled to a sump tank 94 for discharging the dirty coolant into the sump tank.

Sump tank 94 includes a generally cylindrical wall 96 spaced around a central axis. Sump tank 94 further includes an inclined bottom portion 98 with a central lower region 100.

A sump pump 102 is positioned within sump tank 94 offset from the central axis of the sump tank. Sump pump 102 has a pump inlet 104 oriented above and adjacent to central lower region 100 of sump tank 94.

Sump pump 102 includes an impeller shaft 106 driven by a motor 108 for drawing dirty coolant in sump tank 94 into pump inlet 104. A discharge port 110 connects a discharge pipe 112 to pump inlet 104. Dirty coolant drawn by sump pump 102 flows through discharge pipe 112 to a filtration system (not specifically shown).

Outlet 92 of conduit 88 discharges dirty coolant from machine tool station 84 into sump tank 94. Inclined bottom portion 98 is helical so that the dirty coolant swirls down into central lower region 100. Sump pump 102 is offset from the central axis of sump tank 94 to let the coolant swirl in the sump tank. Pump inlet 104 then draws the dirty coolant so that the dirty coolant may be pumped out of sump tank 94.

Sump pump assembly 80 further includes an overflow tank 114. Sump tank 94 is positioned adjacent overflow tank 114. Overflow tank 114 includes side walls 116, 118, 120, and 122 and a bottom portion 124 with a central lower region 126. Overflow tank 114 collects coolant in the event that the coolant overflows sump tank 94. During overflow, overflow tank 114 collects coolant which falls over cylindrical wall 96.

To return the overflow coolant into sump tank 94, overflow tank 114 includes a venturi pump 128. Venturi pump 128 includes a suction pipe 130 for drawing coolant from overflow tank 48 and a conduit 132 for discharging the drawn coolant back into sump tank 94 via conduit 88.

Sump pump assembly 80 is further provided with support portions 134 for orienting the sump pump assembly on floor 82 adjacent machine tool station 84.

Figure 9:
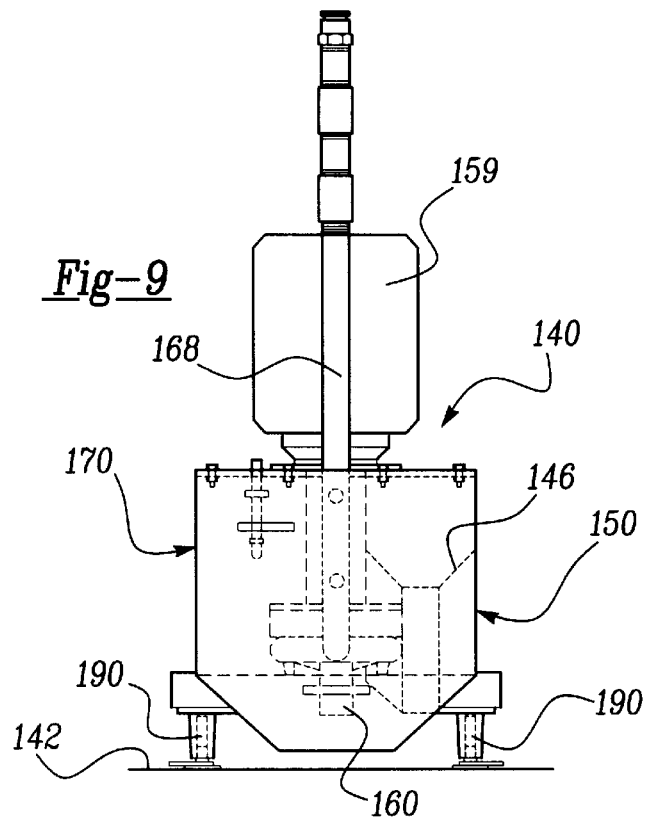
FIG. 9 is a side view of the sump pump assembly of FIG. 7 along the line 9—9.

Referring now to FIGS. 7, 8, and 9, a sump pump assembly 140 in accordance with a third embodiment is shown. Sump pump assembly 140 is mounted above a floor 142 adjacent to a machine tool station 144. A trough 146 is positioned underneath machine tool station 144 above floor 142 to receive dirty coolant from the machine tool station.

Sump pump assembly 140 includes a conduit 148 for receiving dirty coolant form machine tool station 144 and discharging this coolant into a sump tank 150. Sump tank 150 includes a generally cylindrical wall 152 spaced around a central axis. Sump tank 150 further includes an inclined bottom portion 154 with a central lower region 156. Inclined bottom portion 154 is in the shape of a helix.

A sump pump 158 is positioned within sump tank 150 offset from the central axis of the sump tank. Sump pump 158 has a pump inlet 160 oriented above and adjacent to central lower region 156 of sump tank 150. Sump pump 158 includes an impeller shaft 162 driven by a motor 164 for drawing dirty coolant in sump tank 150 into pump inlet 160. A discharge port 166 connects a discharge pipe 168 to pump inlet 160.

Sump pump assembly 140 further includes an overflow tank 170. Sump tank 150 is positioned entirely within overflow tank 170. Overflow tank 170 includes side walls 172, 174, 176, and 178 and a bottom portion 180 with a central lower region 182. Overflow tank 170 collects coolant in the event that the coolant overflows sump tank 150.

To return the overflow coolant into sump tank 150, overflow tank 170 includes a venturi pump 184. Venturi pump 184 includes a suction pipe 186 for drawing coolant from overflow tank 170 and a conduit 188 for discharging the drawn coolant back into sump tank 150.

Sump pump assembly 140 is further provided with support portions 190 for orienting the sump pump assembly on floor 142 adjacent machine tool station 144.

Figure 10:
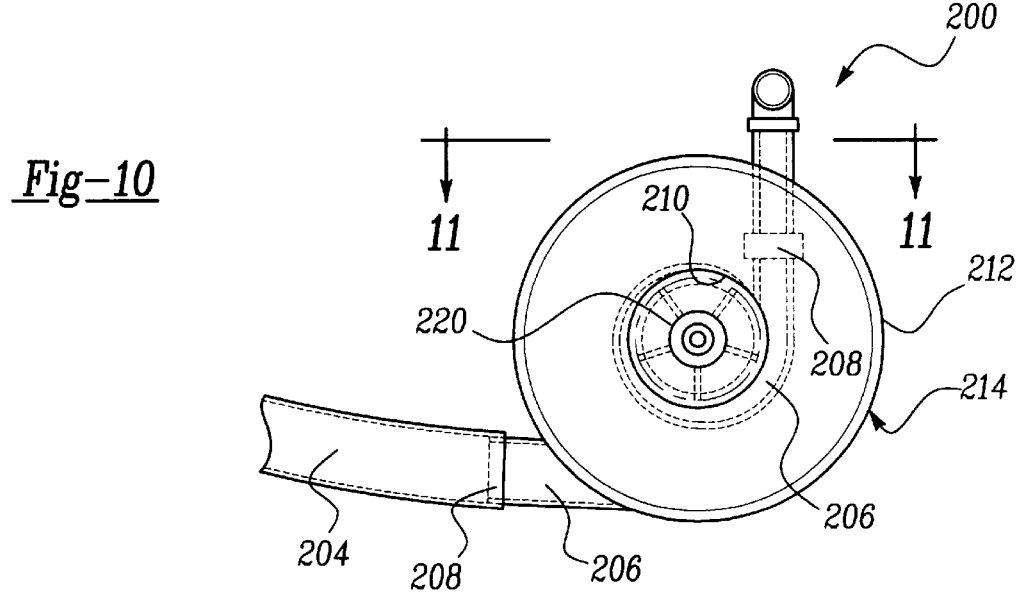
FIG. 10 is a top plan view of a sump pump assembly in accordance with a fourth embodiment of the present invention.
Figure 11:
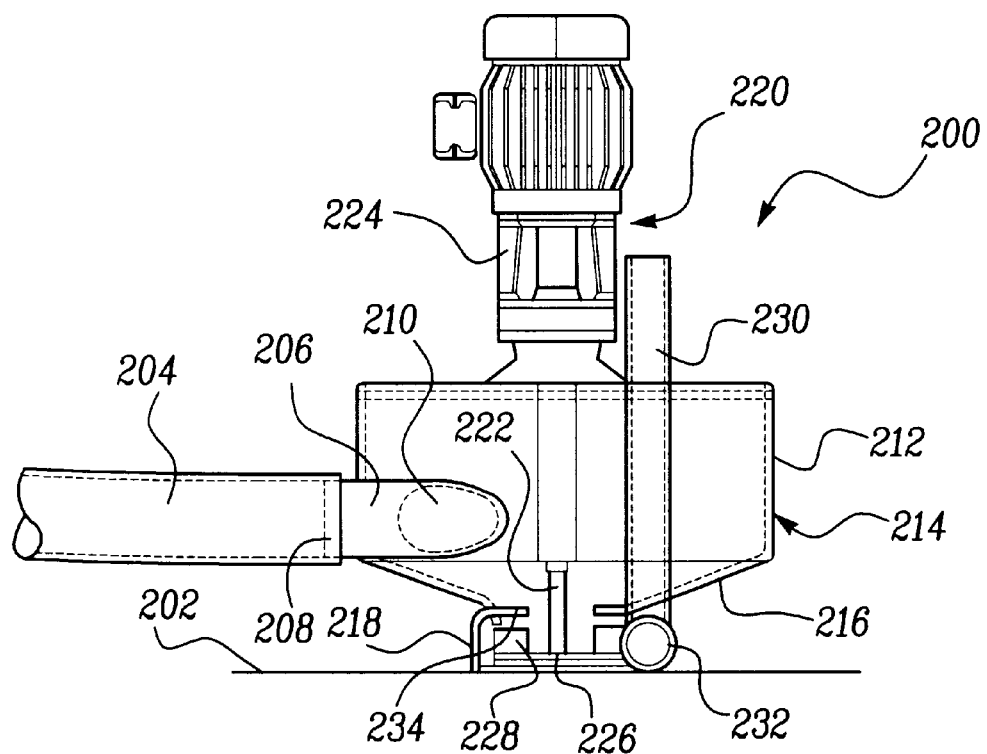
FIG. 11 is a side view of the sump pump assembly of FIG. 10 along the line 11—11.

Referring now to FIGS. 10 and 11, a sump pump assembly 200 in accordance with a fourth embodiment of the present invention is shown. Sump pump assembly 200 is mounted above a floor 202. A trough 204 positioned above floor 202 receives dirty coolant from a machine tool station (not specifically shown).

Sump pump assembly 200 includes a conduit 206 having an inlet 208 coupled to trough 204 for receiving dirty coolant and has an outlet 210 oriented tangentially to a wall 212 of a sump tank 214. Sump tank 214 further includes an inclined bottom portion 216 and a central lower region 218.

A sump pump 220 is positioned within sump tank 214. Sump pump 220 includes an impeller shaft 222 driven by a motor 224. A pump inlet 226 is connected to impeller shaft 222 and fits though a central lower region inlet 227 to lie within central lower region 218. Pump inlet 226 includes vanes 228 for drawing dirty coolant in central lower region 218 up into a discharge pipe 230 via a discharge port 232 coupled to central lower region 218.

Central lower region inlet 227 has a smaller diameter than vanes 228 of pump 214. To enable pump inlet 226 to fit within central lower region inlet 227, this inlet is formed of retractable pieces 234 connected to inclined bottom portion 216. Retractable pieces 234 lie over central lower region 218.

In accordance with the other embodiments, sump pump assembly 200 may also include an overflow tank (not specifically shown) operable with sump tank 214.

Each sump tank of the four embodiments may include limit switches during which disable machine tool stations when dirty coolant overflows the sump tanks. Preferably, the limit switches are controlled to disable the machine tool stations, upon detecting an overflow condition, after the stations have completed their cycle. Parts may be damaged by a machine tool station if the station is abruptly disabled. While the stations are disabled, the overflow tanks discharge the overflow coolant back into the sump tanks. When the level of dirty coolant in the sump tanks falls below a given level, the limit switches reenable the stations.

Thus it is apparent that there has been provided, in accordance with the present invention, a floor mounted sump pump assembly for pumping particulate laden dirty coolant discharged by a floor mounted machine tool station that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A floor mounted sump pump assembly for pumping particulate laden dirty coolant discharged by a floor mounted machine tool station, the sump pump assembly comprising:

a sump tank having a generally cylindrical wall spaced around a central axis and an inclined bottom portion with a central lower region;

a sump pump positioned within the sump tank offset from the central axis of the sump tank, the sump pump having a pump inlet oriented above and adjacent to the central lower region of the sump tank;

a conduit having an inlet coupled to a floor mounted machine tool station for receiving particulate laden dirty coolant from the machine tool station and an outlet coupled to the sump tank for discharging the dirty coolant into the sump tank, the outlet being oriented generally tangential to the cylindrical wall of the sump tank such that the dirty coolant discharged into the sump tank swirls down around the inclined bottom portion to the central lower region for the pump inlet to draw and pump the dirty coolant out of the sump tank;

an overflow tank adjacent to the sump tank so that in the event that the sump tank overflows with dirty coolant the overflow tank collects such overflow coolant; and a return pump operable with the overflow tank to dump the overflow coolant back into the sump tank;

wherein the sump pump assembly is further provided with support portions for orienting the sump pump assembly on the floor adjacent to the machine tool station.

2. The sump pump assembly of claim 1 wherein the sump tank is sized sufficiently small to maintain a sufficient coolant swirl velocity for the dirty coolant swirling in the sump tank to prevent particulate from settling out in the sump tank.

3. The sump pump assembly of claim 1 wherein the inclined bottom portion is helical so that the dirty coolant swirls down into the central lower region.

4. The sump pump assembly of claim 1 wherein the sump pump is offset from the central axis to let the coolant swirl in the sump tank.

5. The sump pump assembly of claim 1 further comprising a trough coupled between the inlet of the conduit and the machine tool station for transferring dirty coolant from the machine tool station to the conduit.

6. The sump pump assembly of claim 1 wherein the central lower region is flat.

7. The sump pump assembly of claim 1 wherein the sump pump further includes a discharge pipe coupled to the pump inlet for transferring dirty coolant drawn by the pump inlet.

8. The sump pump assembly of claim 1 wherein the return pump assembly is a venturi pump.

9. The sump pump assembly of claim 1 wherein the sump tank is positioned within the overflow tank.

* * * * *